United States Patent [19]

Park

[11] Patent Number: 5,841,844

[45] Date of Patent: Nov. 24, 1998

[54] METHOD FOR AUTOMATICALLY CONFIRMING LINE CONNECTION UPON INSTALLATION OF A FACSIMILE SYSTEM

[75] Inventor: Sang-Cheol Park, Gumi, Rep. of Korea

[73] Assignee: SamSung Electronics Co., Ltd., Kyungki-do, Rep. of Korea

[21] Appl. No.: 824,603

[22] Filed: Mar. 26, 1997

[30] Foreign Application Priority Data

Mar. 27, 1996 [KR] Rep. of Korea .................... 8633/1996

[51] Int. Cl.$^6$ ................................................. H04M 11/00
[52] U.S. Cl. .............................. 379/100.14; 379/100.05; 379/34; 358/406; 358/434
[58] Field of Search ................... 379/100.01, 100.03, 379/100.05, 100.06, 100.14, 34, 355, 372, 373; 358/400, 406, 442, 443, 468, 434

[56] References Cited

U.S. PATENT DOCUMENTS 5,101,428  3/1992  Koue .................................. 379/100.14
5,283,661  2/1994  Klees .
5,323,451  6/1994  Yatsunami .

*Primary Examiner*—Wing F. Chan
*Attorney, Agent, or Firm*—Robert E. Bushnell, Esq.

[57] ABSTRACT

A facsimile system automatically confirms a connection status of a facsimile system and a telephone handset upon a power-up by sensing the power. The facsimile system includes first and second connection terminals, and a relay for forming a communication path between the first and second connection terminals and a parallel connection telephone handset according to control of a controller, and for forming a communication path between the first connection terminal and a modem during a facsimile mode. In order to automatically confirm a line connection, the facsimile system generates a facsimile mode control signal upon a power-up, and detects a dial tone; and then, generates a waiting mode control signal if the dial tone is detected, and generating a line connection request message if the dial tone is not detected.

12 Claims, 3 Drawing Sheets

METHOD FOR AUTOMATICALLY CONFIRMING LINE CONNECTION UPON INSTALLATION OF A FACSIMILE SYSTEM

CLAIM FOR PRIORITY

This application makes reference to, incorporates the same herein, and claims all benefits accruing under 35 U.S.C. §119 from an application for Method For Automatically Confirming Line Connection Upon Installing Facsimile earlier filed in the Korean Industrial Property Office on 27 Mar. 1996 and there duly assigned Serial No. 8633/1996.

BACKGROUND OF THE INVENTION

Technical Field

The present invention relates to a facsimile system, and more particularly, relates to a method for automatically confirming a line connection status upon installation of a facsimile system.

Related Art

Generally, a facsimile system provides a function of automatically receiving a facsimile message in response to an incoming call during a user's absence, so that the user may obtain the received facsimile message upon return. One exemplary configuration of such facsimile system is disclosed in U.S. Pat. No. 5,323,451 for Facsimile Device And Automatic Receiving Method Thereof issued to Yatsunami. In addition, if the facsimile system has an automatic answering function, a facsimile module, an attached telephone and a recording device are included for facsimile communication, telephone communication and recording a voice message from a caller. Typically, the facsimile system has two connection terminals for connecting with communication lines. A first terminal is a line connection terminal for connecting with a telephone line of a public service telephone network, and a second terminal is an extension set connection terminal for connecting with an extension line of a telephone handset that is connected in parallel to a network control unit of the facsimile system.

When the facsimile system has two connection terminals, however, installation of such a facsimile system can be difficult. The user may misconnect two connection terminals inadvertently. For example, if the telephone line is connected to the extension telephone connection terminal (not to the line connection terminal), the facsimile function can not be performed. As a result, when the facsimile system is not operated due to the misconnection, and there is no way to determine a cause for the non-operation, unnecessary service calls which are time consuming and highly expensive, are required. One exemplary technique for assisting in the installation of a facsimile system is disclosed, for example, in U.S. Pat. No. 5,283,661 for Method And Apparatus For Assisting In The Installation Of A Facsimile Machine issued to Klees. In Klees '661, verbal installation instructions and specific "help" features in a form of images and text are provided to assist the installer with the initial installation and setup of the facsimile system, and the operator with the operation of the facsimile system as the system includes advanced features and higher image quality. However, there is no installation instruction when the installer misconnects the two connection terminals of the facsimile system inadvertently. Accordingly, further improvement in the facsimile line connection upon installation is still required.

SUMMARY OF THE INVENTION

Accordingly, it is therefore an object of the present invention to provide a new and improved facsimile system having a line connection confirmation feature.

It is also an object to provide a method for automatically confirming a connection status of a facsimile system having a telephone handset upon a power-up, by sensing the power.

These and other objects of the present invention can be achieved by a method for automatically confirming a line connection upon installation of a facsimile system having a telephone handset incorporated therein, first and second connection terminals for connecting to a telephone line and an extension line respectively, and a relay for forming a communication path between said telephone handset and one of said first and second connection terminals during a telephone mode, and for forming a communication path between a modem and said first connection terminal during a facsimile mode. The method includes the steps of: generating a facsimile mode control signal when the facsimile system is turned on, and determining whether a dial tone is detected from the telephone line via the first connection terminal; generating a waiting mode control signal for continued operation of the facsimile system, when the dial tone is detected from the telephone line via the first connection terminal; and alternatively, generating a line connection request message for requesting line connection of the telephone line via the first connection terminal, when the dial tone is not detected from the telephone line via the first connection terminal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
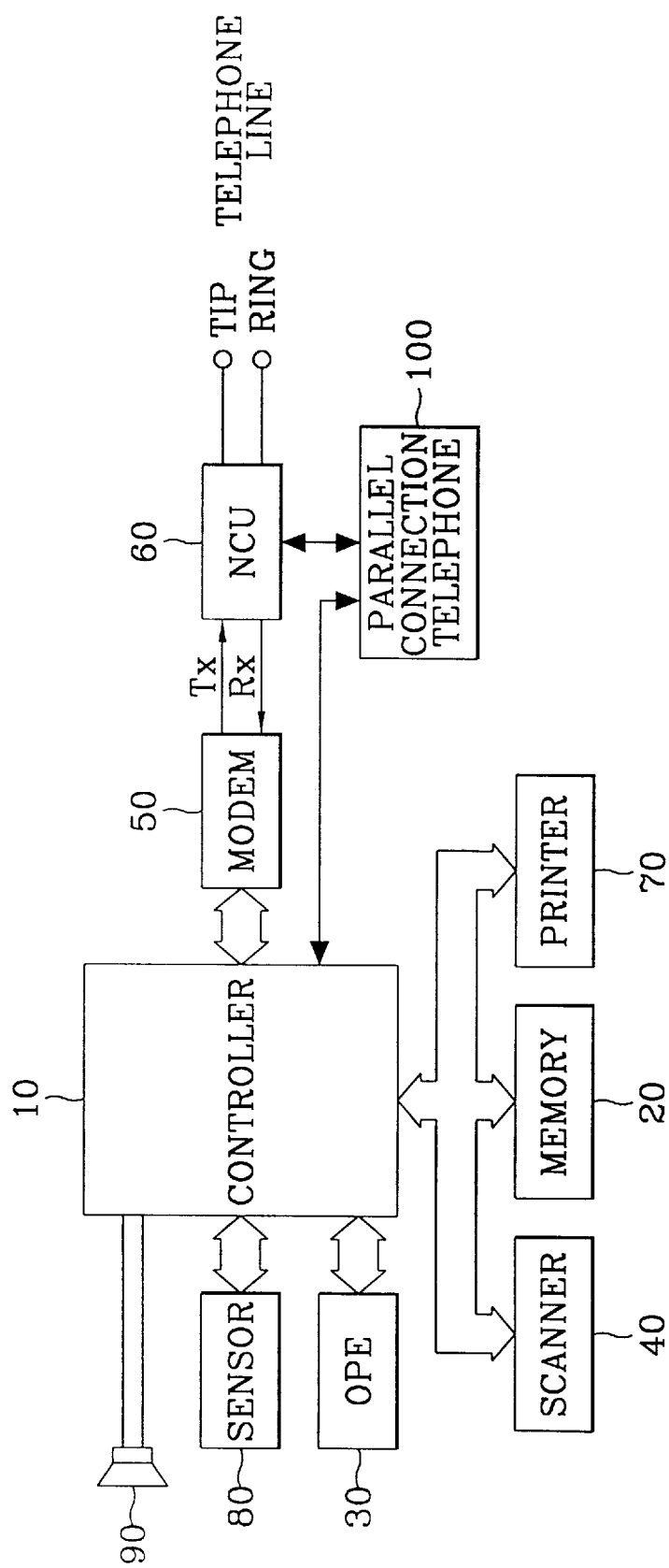
FIG. 1 is a block diagram of a facsimile system constructed according to the principles of the present invention.

Referring now to the drawings and particularly to FIG. 1, which illustrates a facsimile system constructed according to the principles of the present invention. The facsimile system includes a controller 10 for controlling operations of the facsimile system, a memory 20, an operational panel OPE 30, a scanner 40, a modem 50, a network control unit (NCU) 60 connected to a tip and ring terminal of a telephone line, a printer 70, a sensor 80, a speaker 90, and a telephone 100 connected in parallel to the NCU 60.

The memory 20 includes a program memory such as a ROM (not shown) which stores programs for the controller 10 to control the general operation of the facsimile system for transmission or reception of image data from another communication system such as a telephone or a remote facsimile system, a data memory such as a RAM (not shown) which temporarily stores a variety of items of information. The operational panel (OPE) 30 includes a key input unit comprising a plurality of alpha-numeric keys and function keys that are independently operable by manual depression to provide key data to the controller 10 to dial a telephone number of a counterpart communication system, and a display unit having a clock chip incorporated therein for continuously providing a visual display of data indicating various modes of operations of the facsimile system. The sensor 80 senses whether a document is input into the facsimile system, or whether copy paper is stored and available for use, and generates an indicative signal to the controller 10. The scanner 40 transports and scans an image of the input document and then generates image data corresponding to the scanned image. The image data output from the scanner 40 is then processed for either transmission via a telephone line or copy during the copy mode under control of the controller 10. The printer 70 prints the processed image data received from the controller 10 on a printable medium such as individual cut sheets of papers during the reception mode and the copy mode under the control of the controller 10. The modem 50 modulates the processed image data output from the controller 10 into a modulated image signal for transmission, and duplicates the image signal input to the controller 10 during the reception mode under the control of the controller 10. The NCU 60 is connected with a tip and ring terminals of a telephone line to form transmission and reception paths for the modem 50 under the control of the controller 10. The telephone 100 is connected in parallel to the NCU 60 to allow voice communication under the control of the controller 10.

Figure 2:
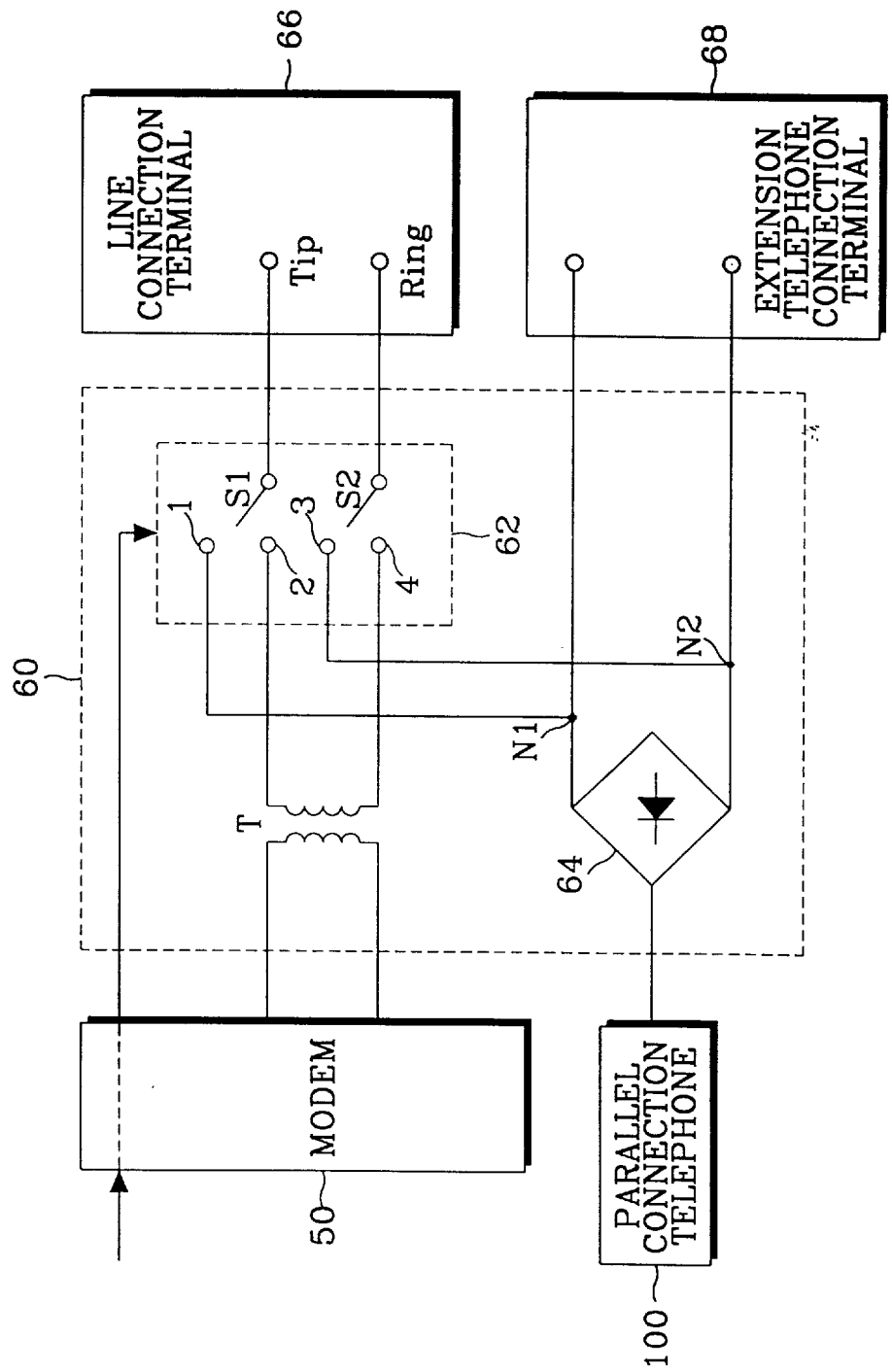
FIG. 2 is a detailed circuit diagram of a network connection unit of the facsimile system as shown in FIG. 1.

Turning now to FIG. 2, which is a detailed circuit diagram of NCU 60 of the facsimile system as shown in FIG. 1. The NCU 60 is connected to line connection terminal 66 which includes tip and ring terminals for connecting with the telephone line. A relay 62 includes switching terminals S1 and S2 and contact terminals 1–4. The switching terminals S1, S2 are connected to the tip and ring terminals of the line connection terminal 66, respectively. The contact terminals 1 and 3 are respectively connected to nodes N1 and N2 and the contact terminals 2 and 4 are connected to a transformer "T". Since the relay 62 is initially set such that the switching terminals S1, S2 are switched to the contact terminals 1, 3, the signals from the telephone line are applied to the nodes N1, N2 to a bridge diode 64. Then, the signal rectified at the bridge diode 64 is applied to the parallel connection telephone 100 and an extension telephone connection terminal 68, so that the facsimile system operates in a telephone mode. Therefore, the parallel connection telephone 100 and the extension telephone perform the communication via the line connection terminal 66. If the parallel connection telephone 100 receives a request signal for requesting reception of facsimile data from the telephone line, the controller 10 applies a facsimile mode control signal to the modem 50 for switching the system to a facsimile mode, upon sensing the request signal. Then, the relay 62 is switched to the contact terminals 2 and 4 in response to the facsimile mode control signal. Accordingly, the controller 10 receives facsimile data input through the modem 50. Further, if it is confirmed by the OPE 30 that there exists the facsimile data to transmit, the controller 10 drives the relay 62 to transmit the facsimile data through the modem 50.

Figure 3:
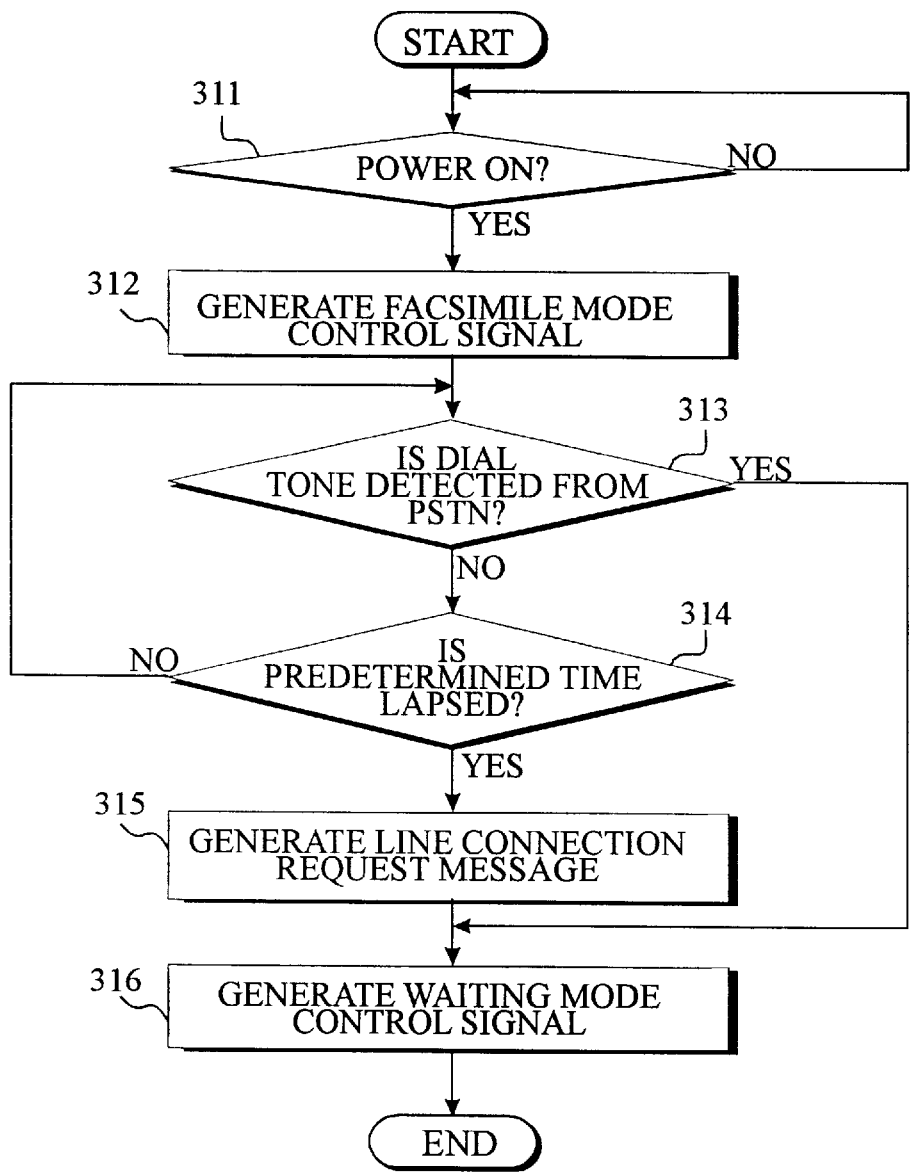
FIG. 3 is a flow chart of an operational process executed by a controller according to the principles of the present invention.

Refer now to FIG. 3, which is a flow chart of an operation when the controller 10 of the facsimile system as shown in FIG. 1 determines the misconnection of the telephone line upon initial installation. After installation of the facsimile system the controller 10 checks, at step 311, whether or not the facsimile system is powered on. If the facsimile system is powered on, the controller 10 generates, at step 312, a facsimile mode control signal for driving the line connection relay 62. Then, the facsimile system switches the lines to the modem 50. The controller 10 checks, at step 313, whether or not a dial tone from the public service telephone network PSTN is received by way of the line connection terminal 66, the relay 62, and the modem 50. If the dial tone is received through the modem 50, the controller 10 generates, at step 316, a waiting mode control signal and initializes the system. Then, the facsimile system performs the normal facsimile function. However, if the dial tone is not received from the PSTN at step 313, the controller 10 monitors whether the dial tone is not received from the PSTN within a predetermined time at step 314 in order to determine the misconnection. Here, the predetermined time must be set longer than the time for which a signalling tone supplied from the telephone line is applied to the controller 10 through the modem 50. If the dial tone is not received within the predetermined time, the controller 10 senses the misconnection, and generates, at step 315, a line connection request message through a voice generation device 90 or the printer 70. The line connection request message may be a voice signal or character data requesting for reconfirmation of the line connection. The line connection request message is intended to alert the user to re-install the proper line connection for operation. Thereafter, the controller 10 generates, at step 316, a waiting mode control signal and initializes the system.

As described above, the present invention advantageously alerts the user of the misconnection of the telephone line in a facsimile system when the user misconnects the telephone line inadvertently or neglects to connect the telephone line to a line connection terminal. As a result, unnecessary service calls due to the misconnection can be eliminated and the system reliability can be enhanced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for automatically confirming a line connection upon installation of a facsimile system having a telephone handset incorporated therein, first and second connection terminals for connecting to a telephone line and an extension line respectively, and a relay for forming a communication path between said telephone handset and one of said first and second connection terminals during a telephone mode, and for forming a communication path between a modem and said first connection terminal during a facsimile mode, said method comprising the steps of:

generating a facsimile mode control signal when said facsimile system is turned on, and determining whether a dial tone is detected from the telephone line via said first connection terminal;

generating a waiting mode control signal for continued operation of said facsimile system, when said dial tone is detected from the telephone line via said first connection terminal; and alternatively, generating a line connection request message for requesting line connection of the telephone line via said first connection terminal, when said dial tone is not detected from the telephone line via said first connection terminal.

2. The method of claim 1, further comprised of said dial tone corresponding a signal received through said first connection terminal connected to the telephone line of a public service telephone network.

3. The method of claim 1, further comprised of said line connection request message corresponding to a preset message generated by a voice generation device for audibly alerting an operator that the telephone line is not connected to said first connection terminal.

4. The method of claim 2, further comprised of said line connection request message corresponding to a preset message generated by a voice generation device for audibly alerting an operator that the telephone line is not connected to said first connection terminal.

5. The method of claim 1, further comprised of said line connection request message corresponding to a preset message printed by a printer to alert an operator that the telephone line is not connected to said first connection terminal.

6. The method of claim 4, further comprised of said line connection request message corresponding to a preset message printed by a printer to alert an operator that the telephone line is not connected to said first connection terminal.

7. A method for automatically confirming a line connection upon installation of a facsimile system, comprising the steps of:

when said facsimile system including a line connection terminal, and relay means for switching between said line connection terminal and a connection node, a modem connected to said relay means, a telephone handset connected to said connection node, an extension telephone connection terminal connected to said connection node, is first turned on, generating a facsimile mode control signal to said relay means for forming a communication path between said line connection terminal and said modem;

detecting whether a dial tone is received from said line connection terminal;

when said dial tone is received from said line connection terminal, generating a waiting mode control signal for forming a communication path between said line connection terminal and said connection node; and when said dial tone is not received from said line connection terminal, generating a line connection request message requesting line connection of a telephone line through said first connection terminal.

8. The method of claim 7, further comprised of said line connection request message corresponding to a preset message generated by a voice generation device for audibly alerting an operator that the telephone line is not connected to said line connection terminal.

9. The method of claim 7, further comprised of said line connection request message corresponding to a preset message printed by a printer to alert an operator that the telephone line is not connected to said line connection terminal.

10. A facsimile system for automatically confirming line connection, comprising:

a line connection terminal for connecting to a telephone line from a public service telephone network;

an extension telephone connection terminal for connecting to a telephone line from a private telephone network comprising a plurality of extension telephone sets;

a telephone handset;

a modem;

a network control unit comprising a relay switch connected to said line connection terminal and switchable between a first connection position for forming a communication path between said modem and said line connection terminal during a facsimile mode, and a second connection position for forming a communication path between said telephone handset and one of said line connection terminal and said extension telephone connection terminal; and a controller for controlling operation of said facsimile system including automatically confirming line connection of said facsimile system, said controller automatically confirming line connection by:

generating a facsimile mode control signal when said facsimile system is first turned on, and determining whether a dial tone is detected from the telephone line via said line connection terminal;

generating a waiting mode control signal for continued operation of said facsimile system, when said dial tone is detected from the telephone line via said line connection terminal; and alternatively, generating a line connection request message for requesting line connection of the telephone line via said line connection terminal, when said dial tone is not detected from the telephone line via said line connection terminal.

11. The facsimile system of claim 10, further comprised of said line connection request message corresponding to a preset message generated by a voice generation device for audibly alerting an operator that the telephone line is not connected to said line connection terminal.

12. The facsimile system of claim 10, further comprised of said line connection request message corresponding to a preset message printed by a printer to alert an operator that the telephone line is not connected to said line connection termninal.

* * * * *